(12) United States Patent
Harter

(10) Patent No.: US 11,772,588 B2
(45) Date of Patent: Oct. 3, 2023

(54) FRONT PANEL PART OF A MOTOR VEHICLE, AND MOTOR VEHICLE

(71) Applicant: Dr. Ing. h.c. F. Porsche Aktiengesellschaft, Stuttgart (DE)

(72) Inventor: Sebastian Harter, Leonberg (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 194 days.

(21) Appl. No.: 17/158,025

(22) Filed: Jan. 26, 2021

(65) Prior Publication Data
US 2021/0245690 A1 Aug. 12, 2021

(30) Foreign Application Priority Data
Feb. 7, 2020 (DE) ...................... 10 2020 103 133.5

(51) Int. Cl.
*B60R 19/48* (2006.01)
(52) U.S. Cl.
CPC ................................... *B60R 19/48* (2013.01)

(58) Field of Classification Search
CPC .............. B60R 19/48; B60R 2019/525; B60R 2019/527
See application file for complete search history.

(56) References Cited

U.S. PATENT DOCUMENTS 7,534,021 B2 * 5/2009 Naik ....................... B60R 19/50
362/546

FOREIGN PATENT DOCUMENTS

| DE | 102005011953 A1 | 3/2006 | |
|---|---|---|---|
| DE | 102011051840 A1 | 1/2013 | |
| DE | 102011122448 A1 | 6/2013 | |
| DE | 102014115629 A1 * | 4/2016 | ............. B60K 11/08 |

* cited by examiner

*Primary Examiner* — Amy R Weisberg
*Assistant Examiner* — Melissa Ann Bonifazi
(74) *Attorney, Agent, or Firm* — LEYDIG, VOIT & MAYER, LTD.

(57) ABSTRACT

A front panel part is part of a motor vehicle. The front panel part has a basic body; and a holder configured to hold an external temperature sensor. The holder is formed integrally on the basic body and is pivotable in relation to the basic body via a film hinge.

13 Claims, 3 Drawing Sheets

FRONT PANEL PART OF A MOTOR VEHICLE, AND MOTOR VEHICLE

CROSS-REFERENCE TO PRIOR APPLICATIONS

Priority is claimed to German Patent Application No. DE 10 2020 103 133.5, filed on Feb. 7, 2020, the entire disclosure of which is hereby incorporated by reference herein.

FIELD

The invention relates to a front panel part of a motor vehicle. The invention furthermore relates to a motor vehicle.

BACKGROUND

A front panel of a motor vehicle can be composed of a plurality of front panel parts. A bumper arrangement can be mounted on the front panel.

Motor vehicles may have front panels, in which an external temperature sensor may be mounted on a front panel part of the front panel via a separate holder. Such a separate holder has to be manufactured separately and mounted on the front panel part.

DE 10 2011 051 840 A1 discloses a holder for a sensor, wherein the holder is designed as a separate assembly which can be mounted on a carrier component via a baseplate. A sensor accommodated in such a holder can be fixed in the holder via at least one clip.

DE 10 2005 011 953 A1 also discloses a separate holder for a sensor, wherein a sensor which is accommodated in the separate holder can be fixed in the holder via a clip.

DE 10 2011 122 448 A1 discloses a further separate holder for a bumper, wherein a sensor which is accommodated in the holder can be fixed via a cover, which is fastened to the holder via a film hinge. The holder has to be fastened separately to a carrier component.

The inventors have recognized that there is a need to simplify the installation of an external temperature sensor on a front panel part of a motor vehicle.

SUMMARY

In an embodiment, the present invention provides a front panel part that is part of a motor vehicle. The front panel part has a basic body; and a holder configured to hold an external temperature sensor. The holder is formed integrally on the basic body and is pivotable in relation to the basic body via a film hinge.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
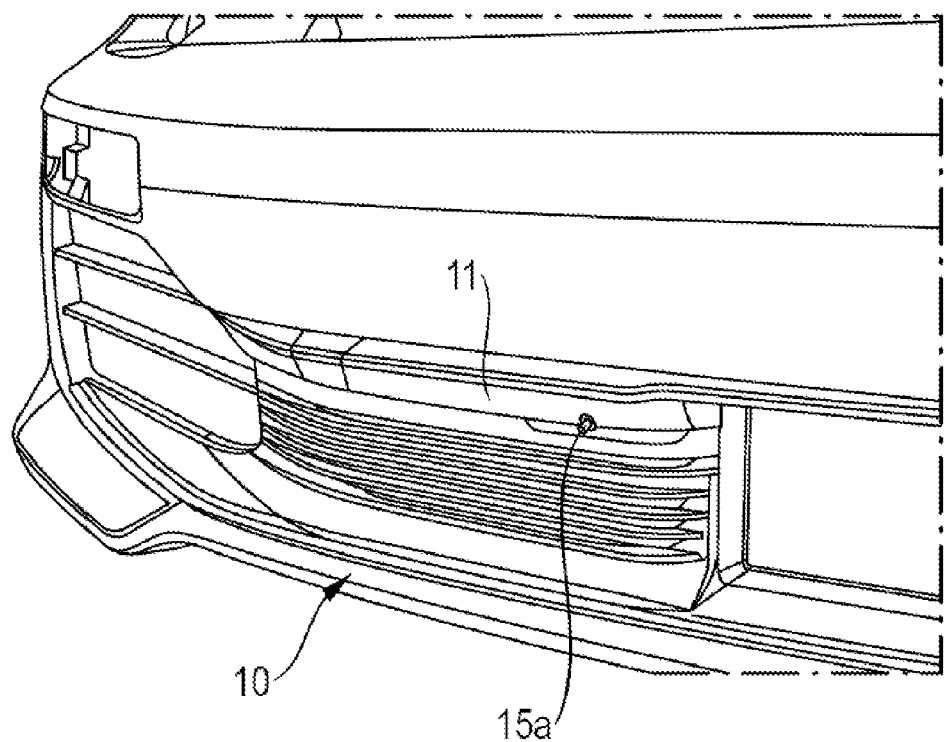
FIG. 1 shows a front panel part of a motor vehicle in a viewing direction from the front together with further front assemblies and together with an external temperature sensor.
Figure 2:
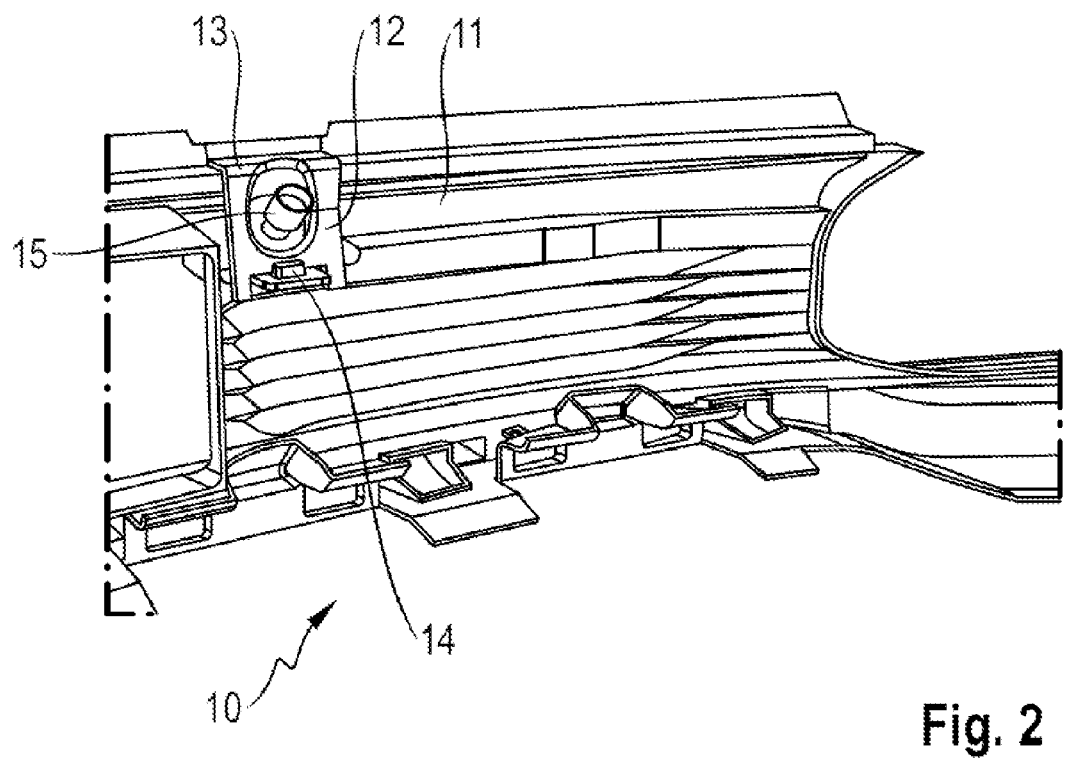
FIG. 2 shows the front panel part from FIG. 1 together with the external temperature sensor in a viewing direction from the rear.

In an embodiment, the present invention provides a novel front panel part of a motor vehicle and a motor vehicle having such a front panel part.

The front panel part according to an embodiment of the invention has a holder for an external temperature sensor. The holder is formed integrally on the basic body of the front panel part and is pivotable in relation to the basic body of the front panel part via a film hinge. Aspects of the present invention provided here provide for the first time a front panel part of a motor vehicle that comprises a holder for an external temperature sensor as an integral assembly, the holder engaging pivotably on the basic body of the front panel part via a film hinge. With embodiments of the present invention, it is accordingly not required to produce a separate holder for an external temperature sensor and to mount the separate holder on the front panel part; on the contrary, the holder is an integral part of the front panel part and engages on the basic body of the front panel part via the film hinge. A separate production step for the holder and an installation step for the holder on the basic body of the front panel part are thus dispensed with. In order to install the external temperature sensor, the holder merely has to be pivoted into an installation position in order, in the installation position, to mount the external temperature sensor in the holder integrated in the front panel part.

According to an advantageous development of the present invention, the holder is pivotable about the film hinge in relation to the basic body at a first end portion, wherein the holder is latchable at a second end portion opposite the first end portion to the basic body in an installation position for the external temperature sensor, preferably with the aid of a clip. The latching of the integral holder on the basic body in the installation position via the at least one clip is particularly simple and is therefore preferred. Preferably after the clipping of the integral holder to the basic body in the installation position, the external temperature sensor can be simply inserted into the holder.

According to an advantageous development of the present invention, the holder receives the external temperature sensor in the installation position. The holder is arranged on a rear side of the basic body in the installation position, wherein the external temperature sensor extends with a portion through the basic body in the direction of the front side of the basic body. This permits a visually advantageous accommodating of the external temperature sensor in the holder and reliable detection of the external temperature via that portion of the external temperature sensor which extends through the basic body in the direction of the front side of the basic body.

The motor vehicle according to the invention has a front panel with a front panel part according to the invention and an external temperature sensor which is accommodated in the holder of the front panel part.

FIGS. 1 to 7 show different views of a front panel part 10 according to embodiments of the present invention for a motor vehicle, wherein the front panel part 10 shown is a lattice component of a front panel. The front panel part 10 has a basic body 11, preferably a lattice-like basic body 11 with openings.

Figure 3:
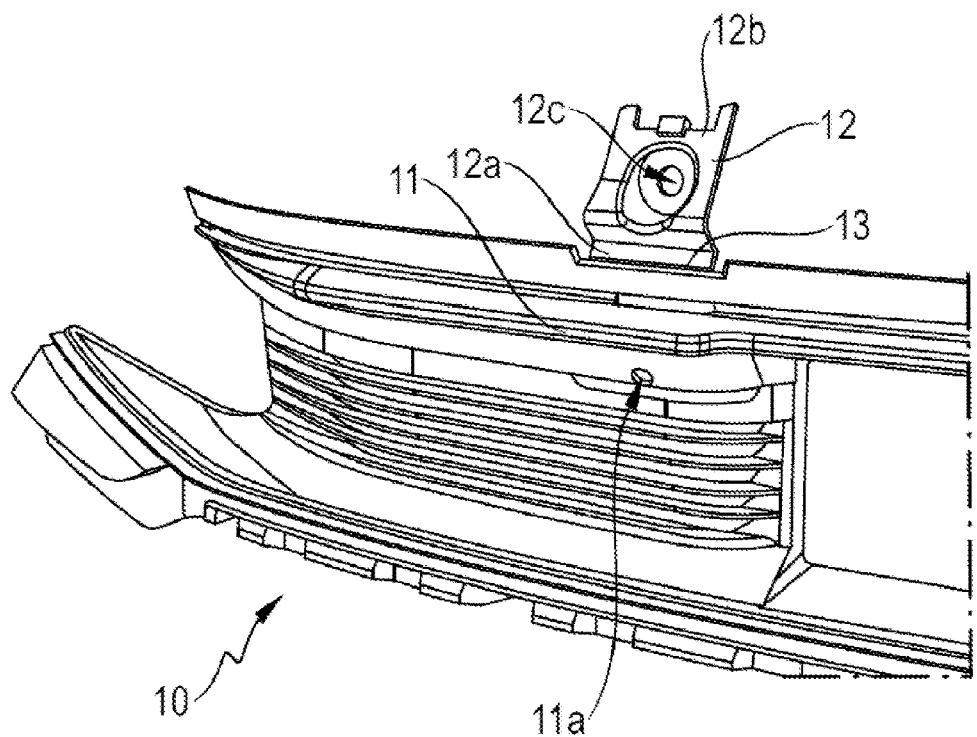
FIG. 3 shows the front panel part in a viewing direction from the front with a holder in a production position.
Figure 4:
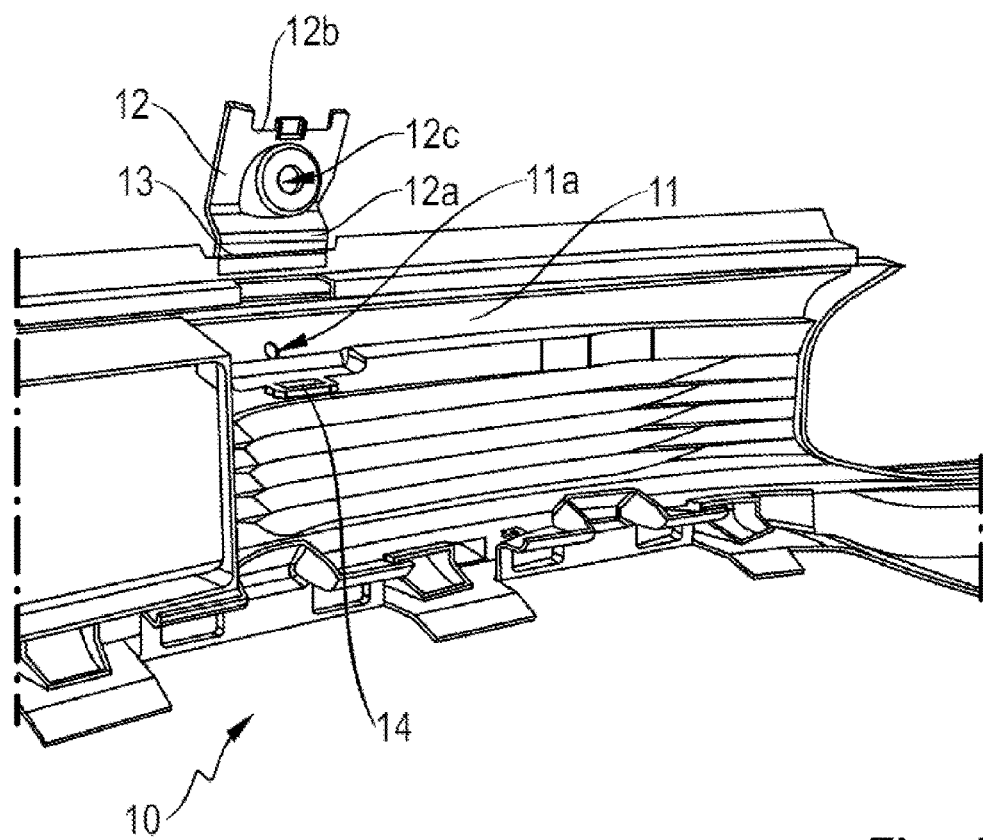
FIG. 4 shows the front panel part from FIG. 3 in a viewing direction from the rear.
Figure 5:
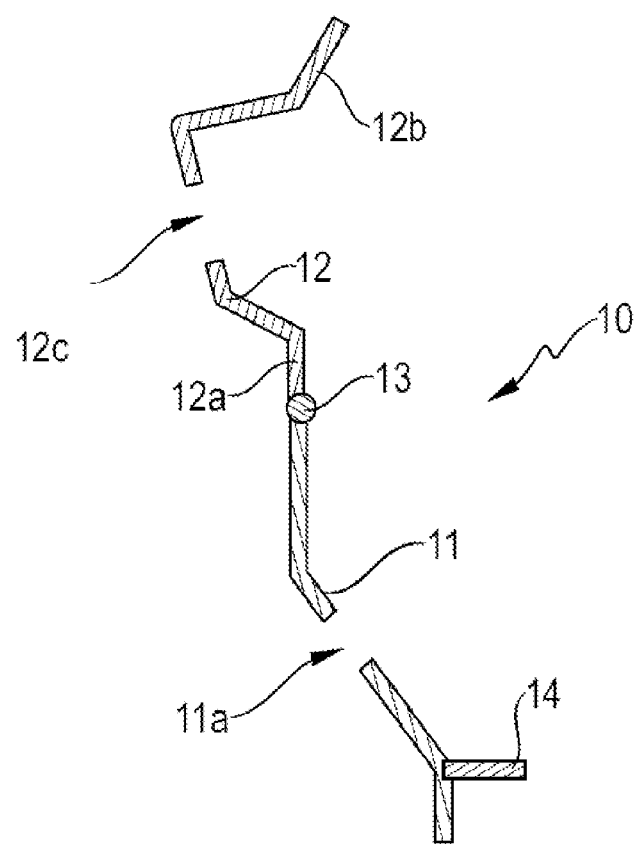
FIG. 5 shows a cross section through FIG. 3 or FIG. 4.

A holder 12 for an external temperature sensor 15 is formed integrally with the basic body 11, wherein the holder 12 which is formed integrally on the basic body 11 is pivotable in relation to the basic body 11 via a film hinge 13, specifically out of the production position shown in FIGS. 3, 4 and 5 into the installation position shown in FIGS. 1, 2, 6 and 7.

The integral holder 12 of the front panel part 10 engages with a first end portion 12a on the basic body 11 via the film hinge 13 and is pivotable in relation to the basic body 11 via the first end portion 12a and about the film hinge 13. At a second end portion 12b of the holder 12 opposite the first end portion 12a, the holder 12 is latchable to the basic body 11 in the installation position shown in FIGS. 1, 2, 6 and 7, specifically preferably via a clip 14.

In the installation position (see FIGS. 1, 2, 6 and 7), the holder 12 receives an external temperature sensor 15. The external temperature sensor 15 extends here from the holder 12 through a recess 12c of the holder 12, wherein a portion 15a of the external temperature sensor 15 also extends through the basic body 11, namely through a recess 11a in the basic body 11. The external temperature of the motor vehicle can be reliably detected via the portion 15a of the external temperature sensor 15.

Figure 6:
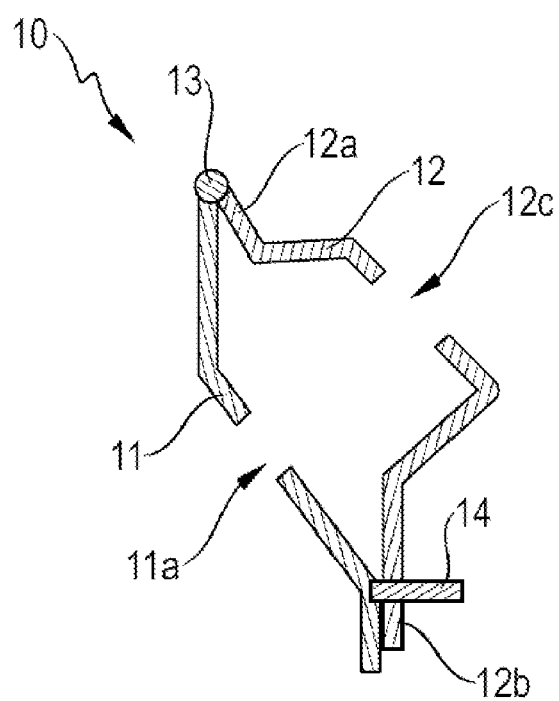
FIG. 6 shows a cross section through FIG. 2 without an external temperature sensor.
Figure 7:
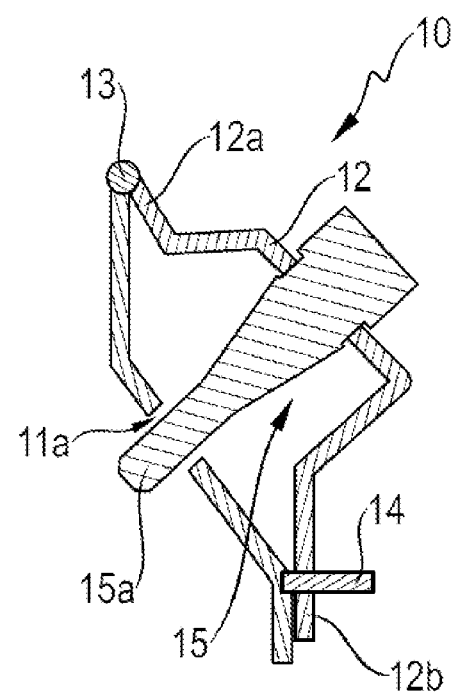
FIG. 7 shows the cross section from FIG. 6 with an external temperature sensor.

As can best be gathered from FIGS. 6 and 7, the holder 12 is arranged on a rear side of the basic body 11 in the installation position and preferably lies at least in sections on the rear side of the basic body 11.

The external temperature sensor 15 extends with the portion 15a from the rear side through the basic body 11, namely through the recess 11a thereof, in the direction of a front side of the basic body 11 that is opposite the rear side.

Owing to the holder 12 for the external temperature sensor 15 being an integral part of the front panel part 10, a separate manufacturing step and installation step of the holder 12 can be omitted. A die for producing the front panel part 10 by injection molding does not require a slider and thus has little die complexity. The integral holder 12 merely has to be pivoted about the film hinge 13 relative to the basic body 11 of the front panel part 10 and preferably latched via the clip 14 in order to receive the external temperature sensor 15.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A front panel part of a motor vehicle, the front panel part comprising:
   a basic body; and
   a holder configured to hold an external temperature sensor, the holder being formed integrally on the basic body and being pivotable in relation to the basic body via a film hinge,
   wherein the holder is configured such that, in an installation position upon pivoting, the holder forms at least part of a recess through which the external temperature sensor extends.

2. The front panel part as claimed in claim 1,
   wherein the holder is pivotable about the film hinge in relation to the basic body at a first end portion, and
   wherein the holder is latchable at a second end portion opposite the first end portion to the basic body in the installation position for the external temperature sensor.

3. The front panel part as claimed in claim 2, wherein the holder is latchable at the second end portion to the basic body via a clip in the installation position for the external temperature sensor.

4. The front panel part as claimed in claim 2, wherein the holder is configured to receive the external temperature sensor in the installation position.

5. The front panel part as claimed in claim 4,
   wherein the holder is arranged on a rear side of the basic body in the installation position, and
   wherein the external temperature sensor extends with a portion through the basic body in the direction of the front side of the basic body.

6. A motor vehicle comprising a front panel comprising the front panel part as claimed in claim 1 and the external temperature sensor which is accommodated in the holder of the front panel part.

7. The front panel part as claimed in claim 1, wherein the holder comprises a holder recess configured to hold the external temperature sensor.

8. The front panel part as claimed in claim 7, wherein the basic body comprises a basic body recess through which the external temperature sensor extends, the basic body recess being complimentary to the holder recess.

9. The front panel part as claimed in claim 1, wherein, in the installation position:
   the basic body is arranged on an external portion of the front panel part, and
   the holder is arranged in an internal portion of the front panel part, positioned behind the basic body.

10. The front panel part as claimed in claim 1, wherein the basic body comprises a lattice structure.

11. The front panel part as claimed in claim 8, wherein the holder recess comprises the at least part of the recess through which the external temperature sensor extends formed by the holder in the installation position upon pivoting.

12. A front panel part of a motor vehicle, the front panel part comprising:
 a basic body; and
 a holder configured to hold an external temperature sensor, the holder being formed integrally on the basic body and being pivotable in relation to the basic body via a film hinge,
 wherein the holder comprises a holder recess configured to hold the external temperature sensor, and
 wherein the basic body comprises a basic body recess through which the external temperature sensor extends, the basic body recess being complimentary to the holder recess.

13. A front panel part of a motor vehicle, the front panel part comprising:
 a basic body; and
 a holder configured to hold an external temperature sensor, the holder being formed integrally on the basic body and being pivotable in relation to the basic body via a film hinge,
 wherein, in an installation position:
  the basic body is arranged on an external portion of the front panel part, and
  the holder is arranged in an internal portion of the front panel part, positioned behind the basic body.

* * * * *